United States Patent [19]
Lee

[11] Patent Number: 5,272,424
[45] Date of Patent: Dec. 21, 1993

[54] GENERATING DEVICE OF PHASE CURRENT INSTRUCTION VALUE FOR ALTERNATING CURRENT SERVOMOTOR AND THE GENERATING METHOD THEREOF

[75] Inventor: Jin-Won Lee, Seoul, Rep. of Korea

[73] Assignee: Samsung Electronics Co., Ltd., Suwon, Rep. of Korea

[21] Appl. No.: 950,672

[22] Filed: Sep. 25, 1992

[30] Foreign Application Priority Data

Oct. 2, 1991 [KR] Rep. of Korea ............... 91-17330

[51] Int. Cl.⁵ ............................................. G05B 11/01
[52] U.S. Cl. ............................ 318/560; 318/254; 318/459; 318/138; 318/617; 318/618; 318/603; 318/652; 318/651; 318/798; 318/812; 318/430; 318/432
[58] Field of Search ............... 318/254, 560, 459, 138, 318/617, 618, 603, 652, 651, 798, 812, 430, 432

[56] References Cited

U.S. PATENT DOCUMENTS

| | | | |
|---|---|---|---|
| 4,368,412 | 1/1983 | Inoue | 318/632 |
| 4,473,786 | 9/1984 | Miyashita et al. | 318/561 |
| 4,980,617 | 12/1990 | Tajima et al. | 318/254 |
| 5,113,125 | 5/1992 | Stacey | 318/21 |

Primary Examiner—William M. Shoop, Jr.
Assistant Examiner—Karen Masih
Attorney, Agent, or Firm—Burns, Doane, Swecker & Mathis

[57] ABSTRACT

A generating device of a phase current instruction value for an A.C. servomotor and the generating method thereof, drives a synchronous A.C. servomotor. A sine wave, namely, a phase current instruction value for commutation of the A.C. servomotor driver can be generated by receiving as an interrupt the detection signal of a commutation sensor which detects the reverse electromotive force of the a motor at the microprocessor. The pulse position of the present since wave is.

The pulse position of present sine wave is determined by the interrupt signal of the microprocessor. The motor is driven and controlled by converting by way of a D-A converter to an analog signal the data for generating a sine wave according to the increase or decrease of an encoder pulse.

1 Claim, 4 Drawing Sheets

GENERATING DEVICE OF PHASE CURRENT INSTRUCTION VALUE FOR ALTERNATING CURRENT SERVOMOTOR AND THE GENERATING METHOD THEREOF

BACKGROUND OF THE INVENTION

1. Field of the Invention

The present invention relates to an apparatus for and method of generating an phase current instruction value for an alternating current servomotor, and more particularly to a device for generating a phase current instruction value for an alternating current (hereinafter referred to as "AC") servomotor and its method having a driver constructed to drive a synchronous AC servomotor wherein a phase current instruction value for a commutation of the AC servomotor driver can be generated by receiving the detection signal of a commutation sensor which detects the reverse electromotive force of the motor.

2. Description of the Prior Art

A device for generating a phase current instruction value for an AC servomotor thus constructed as above can be found in Japanese laid open patent application No. Hei 2-202392. As depicted in FIG. 1, a velocity loop compensating circuit 1 outputs a torque command Tc by adding or subtracting a velocity variation, namely, the difference between a velocity command Vc and a voltage corresponding to the actual velocity of the servomotor from a frequency/voltage converter 9 connected to the encorder 7.

Multipliers 2U, 2V, 2W are constructed to output the phase current instruction values ir(u), ir(v), ir(w) by multiplying respectively the torque command Tc outputted from the compensating circuit 1 and 120 degree-shifted sine wave signal, and the like, in accordance with the electrical angle of the servomotor rotor outputted from the sine wave signal generating circuits 8U, 8V, 8W on u, v, w phases.

Current loop compensating circuits 3u, 3v, 3w are constructed to add or subtract the current variation. In particular, the difference between the respective phase current command values ir(u), ir(v), ir(w) and the phase current values ic(u), ic(v), ic(w) detected from current detectors 5u, 5v, 5w is determined. The current loop compensating circuits 3u, 3v, 3w are constructed to output phase voltage commands, er(u), er(v), er(w) to power amplifiers 4u, 4v, 4w, respectively.

The power amplifiers 4u, 4v, 4w, comprising transistors, PWM(Pulse Width Modulation) circuits and the like, receive the phase voltage commands er(u), er(v), er(w), and supply the phase voltages er'(u), er'(v), er'(w) to respective phases of the servomotor 6 for driving the servomotor 6.

The device for generating a phase current instruction value for an AC servomotor constructed as described above has problems including complication in construction and an increase in manufacturing costs since the device is implemented in hardware.

Accordingly, it is an object of the present invention to provide a generating device of a phase current instruction value for an AC servomotor and a method thereof, which can generate sine waves for commutation of an AC servomotor driver by receiving as an interrupt a signal from a commutation sensor from a microprocessor.

SUMMARY OF THE INVENTION

In order to attain the aforementioned object, according to the present invention, the generating device of a phase current instruction value for an AC servomotor having a device for generating the phase current control signals of the motor, comprises:

an encoder for outputting commutation pulses u, v, w corresponding to the rotating velocity of the motor and a position pulse corresponding to the rotating position of the motor;

a microprocessor for determining the position of a sine wave of a commutation pulse in a counted value of a position pulse when the commutation pulses outputted from said encoder become interrupted in an edge state;

a ROM (read-only-memory) table for reading the data corresponding to the phase current with the data which has counted the position pulse at said microprocessor considered as an address signal;

a buffer for buffering the data read from said ROM table;

a D-A (digital to Analog) converter for outputting a pulse corresponding to the phase current by converting to an analog signal the data outputted from said buffer; and a motor driving controller for supplying three-phase current to the motor by means of the pulse outputted from said D-A converter.

Furthermore, the generating method of a phase current instruction value for an AC servomotor comprises the following steps:

determining for the counter which counts the position pulse corresponding to the rotation position of the motor according to the rotating direction of the motor to perform up-down counting;

counting the position pulse to a direction which has been determined at said determination step;

determining the now-counted value as a ROM table address which has written the data corresponding to the sine wave while the interrupt signal of a commutation signal is supplied during the position pulse being counted at said count step;

reading data written into the ROM table by the address determined at said ROM table address determination step;

converting step for converting to an analog signal the data read at said data read step; and supplying the analog signal obtained from said converting step to the motor by converting the analog signal to the phase current.

BRIEF DESCRIPTION OF THE DRAWING

The foregoing and other advantages and features of the invention will become apparent from the following features of the preferred embodiment when considered along with the illustrations in the accompanying drawings which include the following figures.

DETAILED DESCRIPTION OF THE INVENTION

Figure 1:
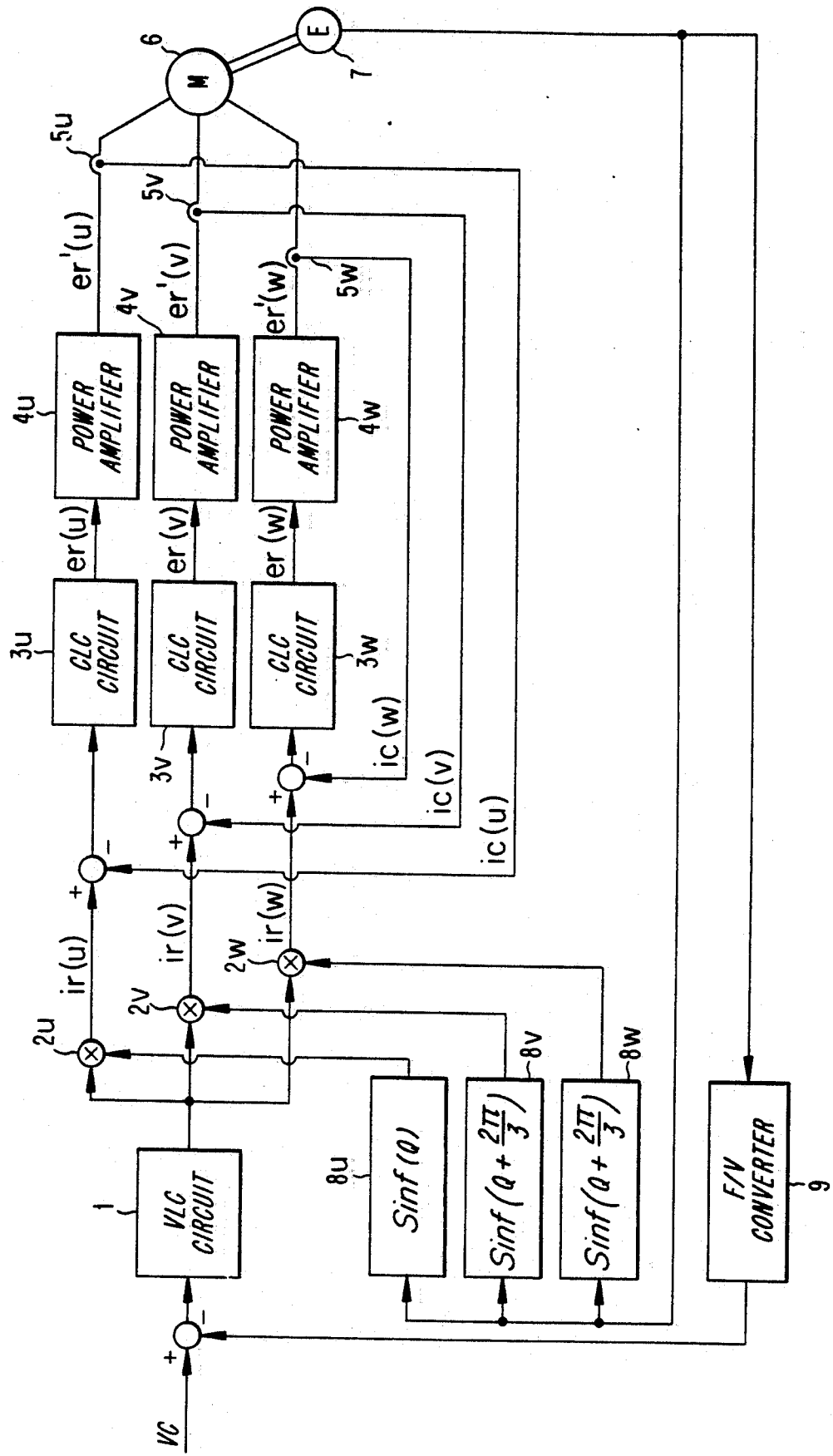
FIG. 1 is a block diagram of a device for generating a phase current instruction value for a conventional three-phase synchronous A.C. servomotor.
Figure 2:
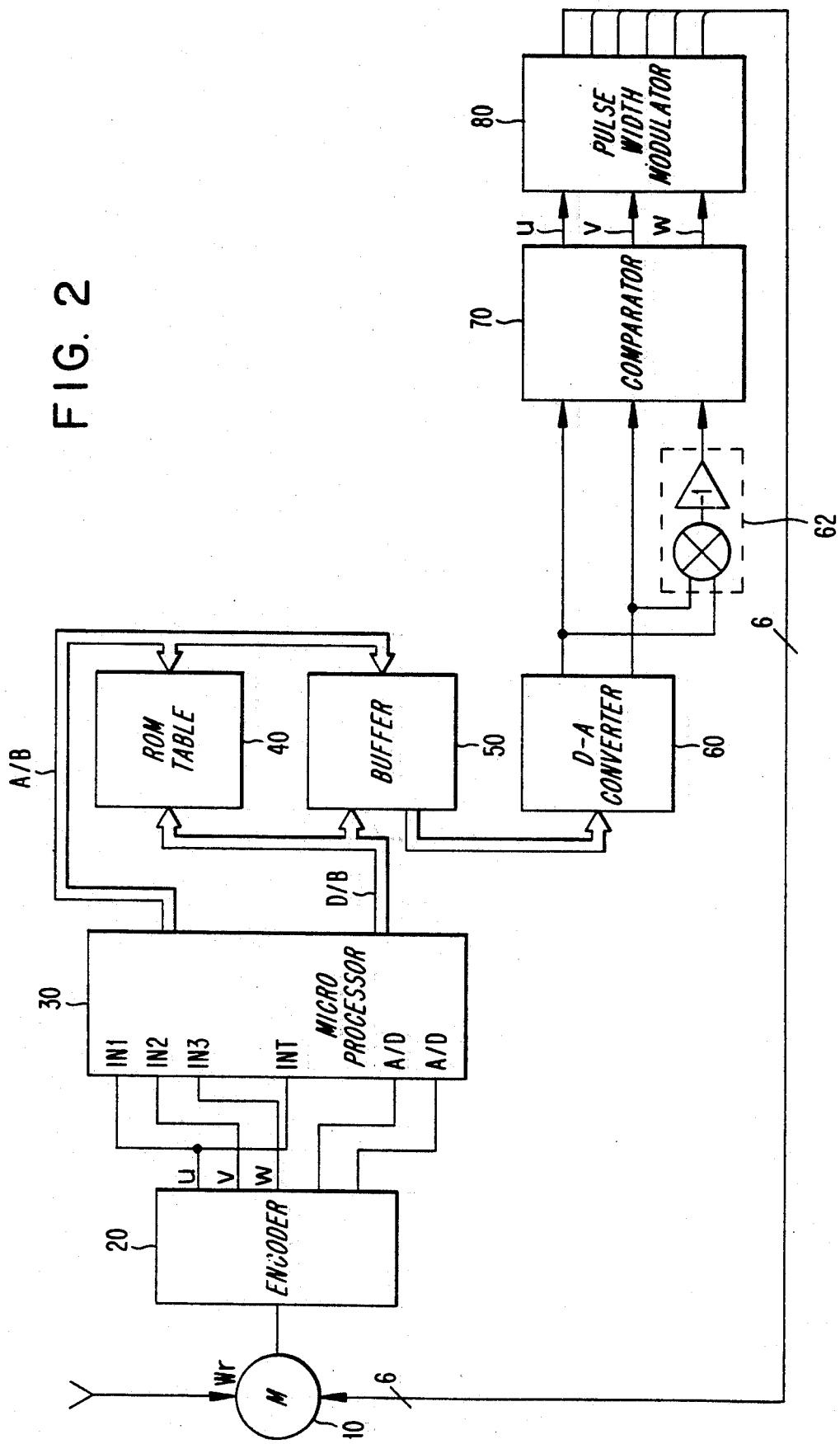
FIG. 2 is a block diagram of a device for generating a phase current instruction value for an A.C. servomotor in accordance with a first embodiment of the present invention.

In FIG. 2, the encoder 20, connected to the A.C. servomotor 10, is constructed to output a pulse corresponding to the rotation position of the motor 10 and commutation pulses u, v, w corresponding to the rotation velocity.

A microprocessor 30 determines the phase of a sine wave by counting the number of position pulses indicative of the rotating position of the motor when the commutation pulses outputted from said encoder are in a falling edge state and become interrupted.

The input terminals IN1, IN2, IN3 of said microprocessor 30 are connected to the encoder 20 for receiving said commutation pulses u, v, w. An interrupt terminal INT is connected to one of said commutation pulses u, v, w. At the same time, a count terminal, A/D, is connected to the microprocessor 30 in order to receive the position pulse from said encoder.

A ROM table 40 writes the data corresponding to a phase current (sine wave). A data bus, D/B, and an address bus, A/B, of said microprocessor are interconnected in order to read the data corresponding to the phase current with the data which has counted the position pulse at said microprocessor 30 considered as an address signal.

A buffer 50 is constructed to buffer the data read from said ROM table by said microprocessor 30. The data bus, D/B, and the address bus A/B of the ROM table 40 are interconnected.

A D-A converter 60 outputs a pulse corresponding to a phase current by converting the data corresponding to a two-phase current outputted from said buffer 50 by converting the data to an analog signal.

A mixer 62 is constructed to output the pulse corresponding to a third phase of current by mutually adding and inverting the pulse corresponding to the two-phase current outputted from said D-A converter 60.

A comparator 70 compares the reference triangular wave with the three-phase current outputted from said D-A converter 60 and the mixer 62.

A pulse width modulator 80 distributes the three-phase current outputted from said comparator 70 into 6 signals for supply to a motor driving controller.

Figure 3A:
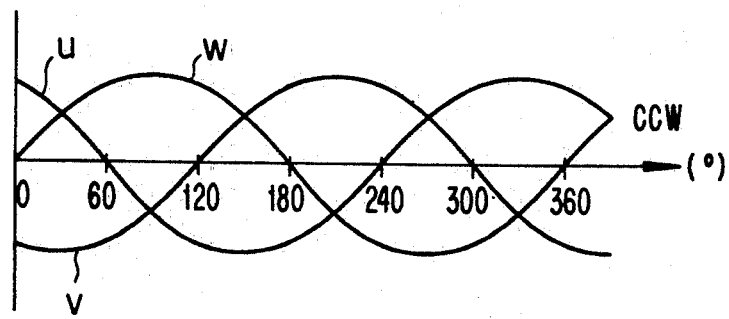
FIG. 3a-d are waveform drawings for explaining a generating device of a phase current instruction value in accordance with the present invention.
Figure 3B:
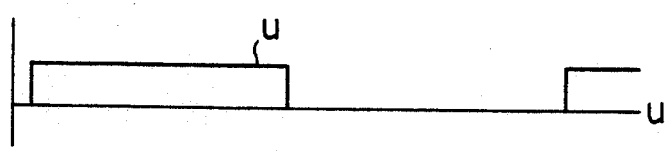
Figure 3C:
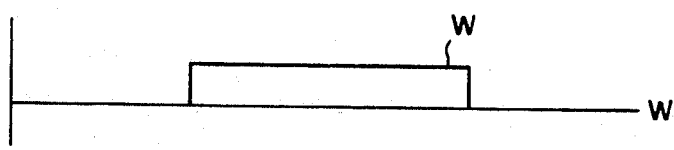
Figure 3D:
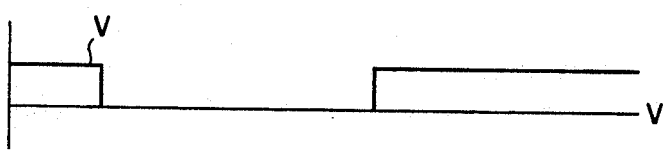

In order to generate the a sine wave corresponding to the phase current instruction value by utilizing the generating device of a phase current instruction value for an A.C. servomotor as constructed in accordance with the present invention, when a motor shaft rotates counter clockwise, the commutation signals u, v, w, outputted from the encoder 20 are outputted as depicted in FIG. 3b, FIG. 3c and FIG. 3d. Further, the commutation signals u, v, w generate the sine waves as depicted in FIG. 3a in conformity with the signals on u, v, and w phases.

Furthermore, in order to generate said sine wave, the starting position of the sine wave signal should be determined by determining the rising edge or falling edge of the commutation signals u, v, w, outputted from the encoder 20. The determining operation is performed when a falling edge of one of the commutation pulses is received by the microprocessor 30.

Meanwhile, the A.C. servomotor has a predetermined numbers of poles, generally comprising four poles, six poles or eight poles.

In the case of an A.C. servomotor having four poles, two-periods of a sine wave are outputted when the motor rotates 360 degrees, and in the case of an A.C. servomotor having six poles, three-periods of a sine wave are outputted when the motor rotates 360 degrees.

Since the specifications of the motor may have different poles, the specifications of the software may vary.

The servomotor as used in the embodiment of the present invention is equipped with four poles and has one thousand encoder pulses. As the counter internally stored in the microprocessor 30 performs samples each encoded pulse four-times, the counted value becomes 4,000 when the motor makes one turn.

In other words, when the motor makes one turn according to the velocity instruction value Wr, two-periods of a sine wave as depicted in FIG. 3a are outputted and at this moment, u, v, w-phase signals which are the commutation signals outputted from the encoder 20 output 2 pulses respectively.

Namely, one cycle, 360 degrees, of a sine wave is generated when the counter value of the counter in the microprocessor 30 passes 2,000.

Accordingly, by programmed software, the pulse position of the present sine wave is determined by the interrupt signal of the microprocessor 30, and the sine wave can be generated by the pulse of the encoder 20.

Meanwhile, in order to perform the above-mentioned method, the data suitable for the sine wave pulse is stored in the ROM table 40 by establishing 2,000 bytes from a certain memory address.

Thereafter, when the interrupt signal is supplied to the interrupt terminal INT of the microprocessor 30 under a condition when an external interrupt is connected to the u phase, the position of the sine wave is determined, against which a proper address of ROM table 40 is fixed. The phase current can be obtained by seeking the address of the ROM table 40 in accordance with the signal of the encoder 20 and by supplying the read data to the D-A converter 60 until another interrupt signal is supplied to the interrupt terminal INT of the microprocessor 30.

Figure 4:
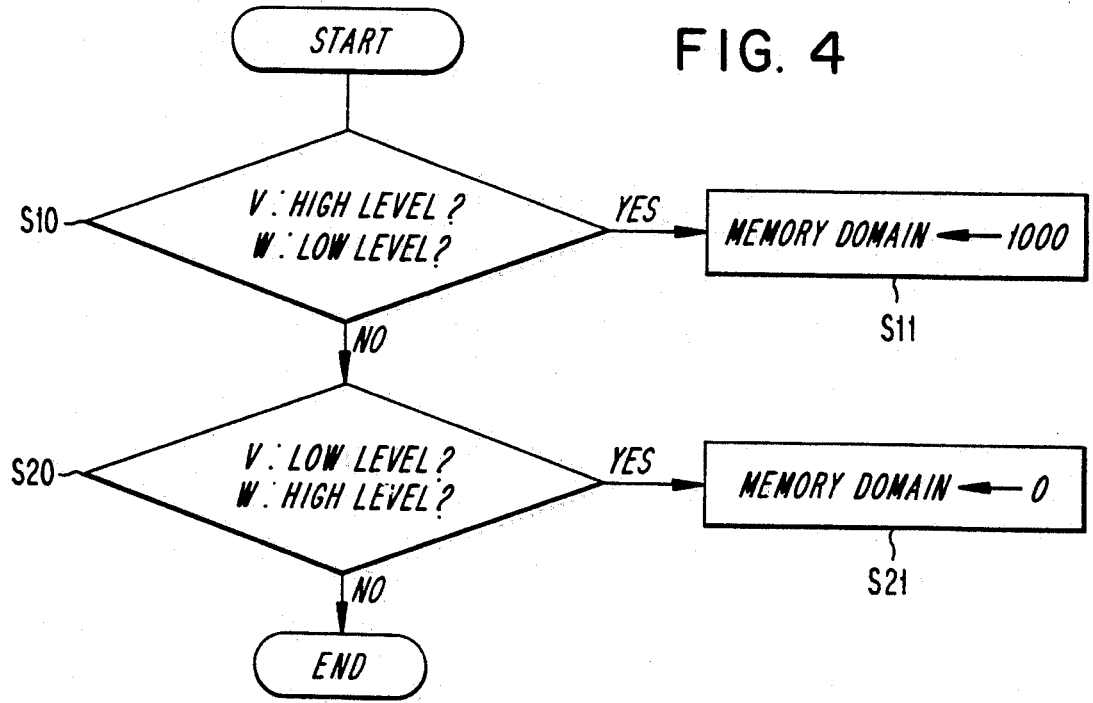
FIG. 4 is a flow chart for explaining an external interrupt operation procedure in an embodiment of the present invention.

FIG. 4 is a flow chart for explaining the generating method of the sine wave by considering as an interrupt signal the signal on the u phase out of u, v, w phases inputted to the microprocessor 30 from the encoder 20, and is a method of finding the phase position of sine wave on R phase by utilizing an interrupt signal (falling edge on u phase).

In other words, it should be considered that when interrupted, chances are that the position of the sine wave phase is 0 degrees (or 360 degrees) or 180 degrees on R phase. When the motor rotates counter clockwise at falling edge, the phase position of the sine wave is 180 degrees and when the motor rotates clockwise, the phase position of the sine wave is 0 degrees on R phase, and the condition on v, w phases at the interrupt routine is determined at step S10.

When the result at step S10 shows that V phase is at a high level and W phase is at a low level (in the case of yes), the phase position of the sine wave is determined to be 180 degrees. Next the procedure of the microprocessor advances to step S11, and writes 1,000 pulses of data on the memory domain where the data determining the ROM table address is stored.

When the result at step S10 shows that V phase is not high level and W phase is not at a low level (in the case of no), step S20 determines whether V phase is low level and W phase is at a high level.

When said result shows that V phase is at a low level and W phase is at a high level (in the case of yes), the phase position of the sine wave is determined to be 0 degrees. The procedure advances to step S21, and writes the data 0 on the memory domain where the data determining the ROM table address is stored.

In other words, by performing this operation when R phase of the sine wave is determined, the sine waves on S phase and T phase are acceptable by shifting the phases 120 degrees and 240 degrees respectively, which can also be outputted by the software.

When V phase is not at a low level and W phase is not at a high level (in the case of no) at step S20, which is the condition that the ROM table address has been determined, the output signal of the encoder 20, which has received the output signal of the A.C. servomotor, namely, the external interrupt operation, is stopped.

Figure 5:
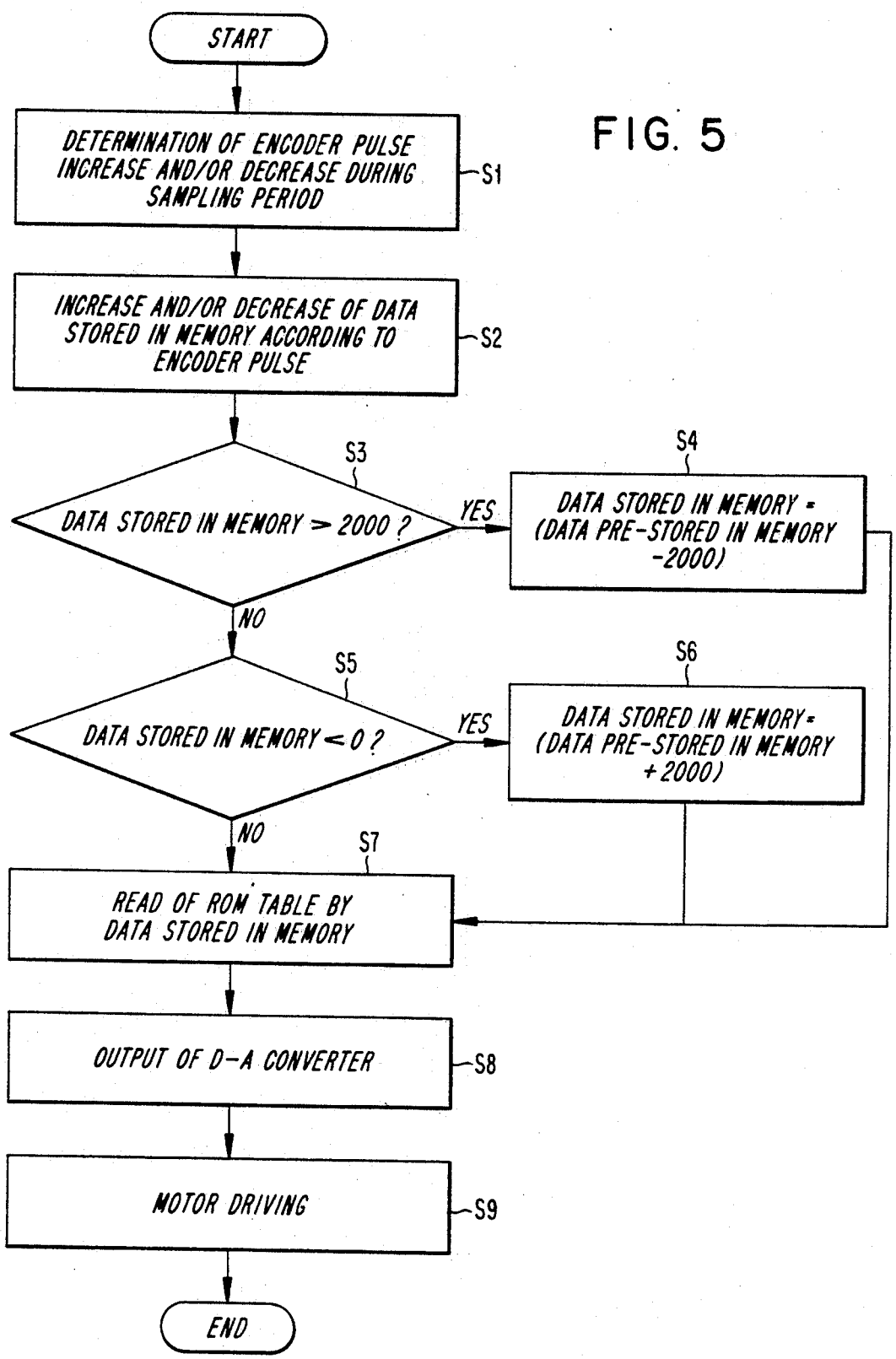
FIG. 5 is a flow chart for explaining a timer interrupt operation procedure in an embodiment of the present invention.

FIG. 5 relates to a method of generating the phase current instruction value of the motor having an interrupt time of 500 μsec. When a timer interrupt operation is started, the step S1 determines the increase or decrease of the encoder pulse during a sampling time period in accordance with the rotation direction of the motor 10, and then the procedure of the microprocessor 30 advances to step S2 and the data determining the address of the ROM table is increased or decreased according to the increased or decreased quantity of the encoder pulse determined at said step S1.

At step S3, the output of the encoder 20 which outputs the position pulse according to the rotation of the motor 10 is counted. When the data stored in the memory is not over 2,000(in the case of no), the procedure advances to step S5 for determining whether the data stored in the memory is less than 0. If the data is large (in the case of no), the procedure advances to step S7.

Accordingly, at step S7, the data of the ROM table 40 is read by the data stored in the memory.

The procedure advances to step S8, reads at the ROM table 40 the data designated to the address determined at said step S7 for buffering at the buffer 50, supplies the data to D-A converter 60, converts the data to an analog signal, outputs the analog signal to the mixer 62 and the comparator 70, and finally modulates the pulse width at the pulse width modulator 80.

Next, the procedure advances to step S9, and supplies the signal pulse width-modulated at said pulse width modulator 80 to the A.C. servomotor 10 for driving control.

When the data stored in the memory at step S3 is more than 2,000(in the case of yes), the sine wave pulse of 360 degrees has occurred. In order to generate another sine wave pulse, the procedure advances to step S4, subtracts 2,000 pulses of data from the pre-stored memory data, and stores the results in the memory, advances to step S7 and performs the operations of "from step 1 to step S7" processes repeatedly.

When the data stored in the memory at step S5 is less than 0(in the case of yes), in order to generate a sine wave pulse of 360 degrees, the procedure advances to step S6, adds 2,000 pulses of data to the data pre-stored in the memory for storing new data in said memory, and proceeds to step S7 for determination of the the address of ROM table 50 by utilizing the data newly-stored in the memory.

According to the generating device of a phase current instruction value for an A.C. servomotor and the method thereof, the sine wave is generated by being interrupted by the commutation signal at the microprocessor, thus improving the driving efficiency of the motor in a relatively simple construction.

What is claimed is:

1. A method of generating a phase current instruction value for an A.C. servomotor, said method comprising the steps of:

counting incremental changes in a position pulse corresponding to a rotation position of the motor during a change in a commutation pulse from a first signal level to a second signal level to obtain a count value;

determining a ROM table address according to said count value;

reading data from the ROM table at the address;

converting the data read to an analog signal; and converting the analog signal to a phase current and supplying the phase current to the motor for controlling the motor.

* * * * *